United States Patent
Bilan et al.

(10) Patent No.: US 10,078,478 B2
(45) Date of Patent: Sep. 18, 2018

(54) MERGING PRINT DATA AND METADATA FOR A PRINT JOB PROCESSED IN A PRINT WORKFLOW

(71) Applicants: Thomas Nathan Bilan, Longmont, CO (US); Scott Matthew Jones, Longmont, CO (US); Linda Sue Liebelt, Boulder, CO (US); Michael Glen Lotz, Longmont, CO (US); Jeffrey Alan Sikkink, Longmont, CO (US); Marquis G. Waller, Beverly, OH (US)

(72) Inventors: Thomas Nathan Bilan, Longmont, CO (US); Scott Matthew Jones, Longmont, CO (US); Linda Sue Liebelt, Boulder, CO (US); Michael Glen Lotz, Longmont, CO (US); Jeffrey Alan Sikkink, Longmont, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/058,574

(22) Filed: Mar. 2, 2016

(65) Prior Publication Data
US 2017/0090838 A1   Mar. 30, 2017

Related U.S. Application Data

(60) Provisional application No. 62/234,399, filed on Sep. 29, 2015.

(51) Int. Cl.
*G06F 3/12* (2006.01)

(52) U.S. Cl.
CPC ............ *G06F 3/1275* (2013.01); *G06F 3/127* (2013.01); *G06F 3/1208* (2013.01);
(Continued)

(58) Field of Classification Search
None
See application file for complete search history.

(56) References Cited

U.S. PATENT DOCUMENTS 5,371,838 A     12/1994  Fujii et al.
6,549,947 B1 *   4/2003  Suzuki ................. G06F 3/1207
                                                    358/1.15
(Continued)

OTHER PUBLICATIONS

PCT International Search Report; PCT/JP2016/004387; dated Sep. 28, 2016.

*Primary Examiner* — Fan Zhang
(74) *Attorney, Agent, or Firm* — Duft Bornsen & Fettig LLP

(57) ABSTRACT

Systems and methods are provided for merging print data and metadata for a print job processed in a print workflow. One system is a print server that monitors an input device that receives print files and metadata files, groups at least one print file and at least one metadata file into a batch based on a predetermined pattern defined for the input device, and initiates processing of the batch as a print job in a print workflow in response to a determination that the batch meets a threshold condition. A step of the print workflow is configured to merge document properties from the at least one print file and the at least one metadata file into a single document properties file. Subsequent steps in the print workflow process the print job according to the single document properties file.

20 Claims, 4 Drawing Sheets

(52) U.S. Cl.
CPC .......... *G06F 3/1211* (2013.01); *G06F 3/1262* (2013.01); *G06F 3/1288* (2013.01)

(56) References Cited

U.S. PATENT DOCUMENTS

| | | |
|---|---|---|
| 7,103,833 B1 | 9/2006 | Sane et al. |
| 7,215,434 B1 | 5/2007 | Janse et al. |
| 7,502,527 B2 | 3/2009 | Momose et al. |
| 7,538,910 B2 | 5/2009 | Czudak et al. |
| 8,102,551 B2 | 1/2012 | Shiohara et al. |
| 8,144,360 B2 | 3/2012 | Buckley |
| 8,233,180 B2 | 7/2012 | Shepherd et al. |
| 8,269,837 B2 | 9/2012 | Shirakawa et al. |
| 8,619,269 B2 | 12/2013 | Jahn et al. |
| 8,699,076 B2 | 4/2014 | Tonouchi |
| 9,665,589 B1* | 5/2017 | Joyce .................. G06F 17/3015 |
| 2007/0027979 A1* | 2/2007 | Emerson ............... H04L 67/322 709/224 |
| 2008/0043281 A1* | 2/2008 | Kato .................. H04N 1/00175 358/1.15 |
| 2008/0307393 A1* | 12/2008 | Cartledge ................. G06F 8/71 717/120 |
| 2009/0150394 A1* | 6/2009 | Bailor .................. G06F 17/2288 |
| 2009/0213425 A1* | 8/2009 | Oishi .................. H04N 1/00222 358/1.15 |
| 2009/0225365 A1 | 9/2009 | Hayakawa |
| 2011/0317208 A1* | 12/2011 | Kaneda ................. G06F 3/1212 358/1.15 |
| 2012/0147426 A1 | 6/2012 | Naka et al. |
| 2013/0293911 A1 | 11/2013 | Watanabe et al. |
| 2015/0121063 A1* | 4/2015 | Maller ................ H04L 63/0435 713/153 |

* cited by examiner

MERGING PRINT DATA AND METADATA FOR A PRINT JOB PROCESSED IN A PRINT WORKFLOW

RELATED APPLICATIONS

This document claims priority to provisional U.S. patent application Ser. No. 62/234,399 (filed on Sep. 29, 2015) titled "MERGING PRINT DATA AND METADATA FOR A PRINT JOB PROCESSED IN A PRINT WORKFLOW," which is hereby incorporated by reference.

FIELD OF THE INVENTION

The invention relates to the field of printing, and in particular, to managing print data for a print workflow.

BACKGROUND

A print shop handles the production and organization of documents on a large scale. For example, in addition to receiving and processing large print jobs (e.g., hundreds or thousands of documents) from a plurality of clients for printing on high-speed printers, a print shop may include a number of modules that perform post-print handling such as inserting and mailing of the documents. Because of this enhanced functionality, print shops are useful for numerous high-volume printing applications such as mass-mail printing of time sensitive statements and bills.

Each print job sent to the print shop is associated with a print workflow, which is an ordered set of activities to perform at the print shop to transform the electronic data of the print job into a deliverable physical product for a customer. A typical workflow includes a series of steps, for example, "pre-flighting" the print job to check for errors, rendering the print job, physically printing and drying the print job, proofing the printed job, generating billing for a customer, shipping, and removing the print job from the system. Because print jobs typically request different types of processing, the specific workflow associated with a given print job may vary on a job-by-job basis.

A print workflow may process a print job according to user-submitted print data files (e.g., in a Portable Document Format (PDF) file format). Additionally, each print job may be associated with metadata that has contextual information used to describe the print job and/or documents in the print job. However, in previous systems, print data and metadata are maintained separately during processing in the print workflow which results in processing inefficiencies.

SUMMARY

Embodiments described herein provide for merging of print data and metadata for a print job processed in a print workflow. A step in the workflow combines print data and metadata into a single metadata file so that subsequent steps in the workflow may operate on the combined files. When the files are combined, the relationship between the print file and its metadata file may be maintained so that other steps in the workflow may use information from each file in a coordinated fashion.

One embodiment is an apparatus that includes a print server monitors an input device that receives print files and metadata files, groups at least one print file and at least one metadata file into a batch based on a predetermined pattern defined for the input device, and initiates processing of the batch as a print job in a print workflow in response to a determination that the batch meets a threshold condition. A step of the print workflow is configured to merge document properties from the at least one print file and the at least one metadata file into a single document properties file. Subsequent steps in the print workflow process the print job according to the single document properties file.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
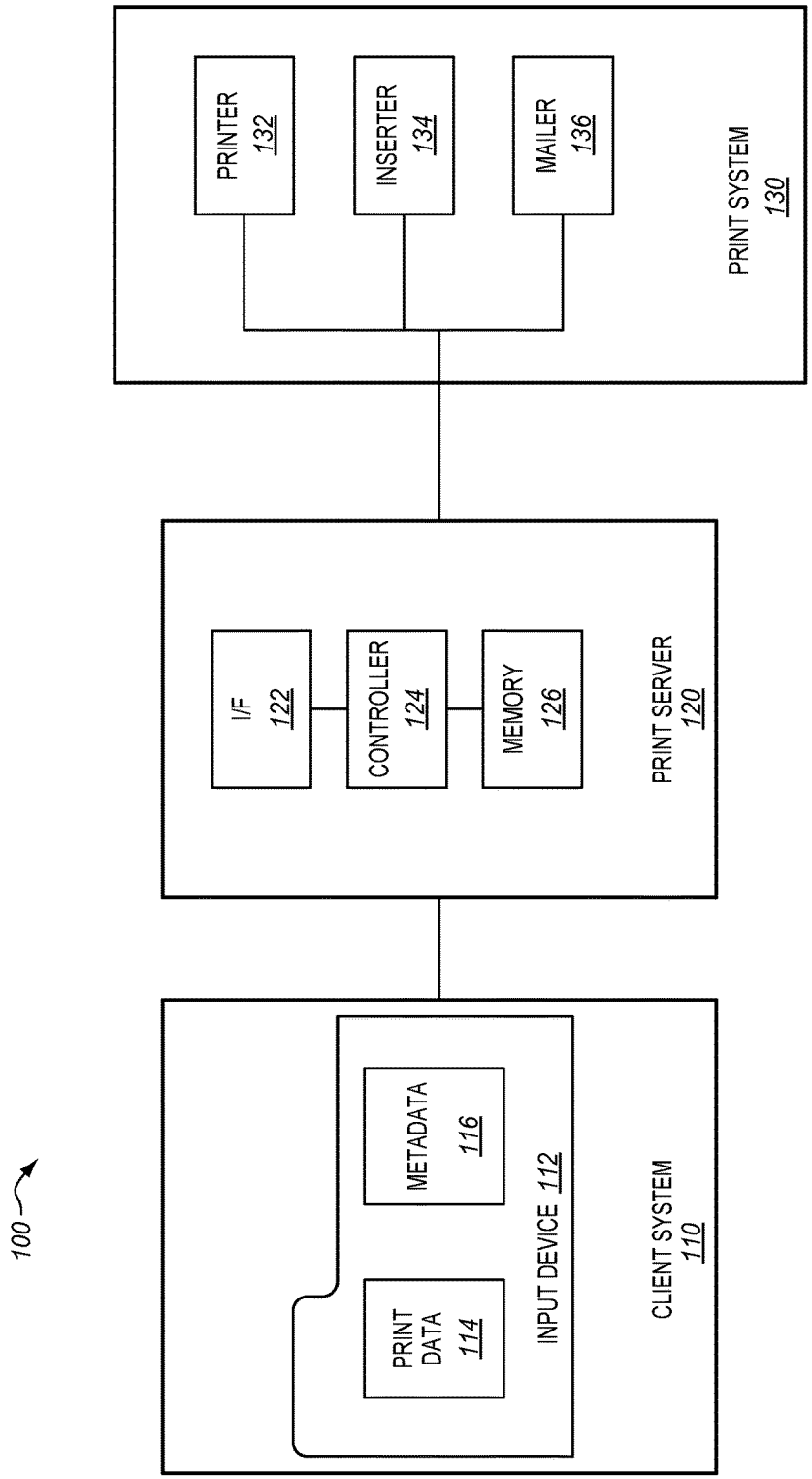
FIG. 1 is a block diagram of a print shop architecture in an exemplary embodiment.

FIG. 1 is a block diagram illustrating a print shop architecture 100 in an exemplary embodiment. In this embodiment, the print shop architecture 100 includes a client system 110, a print server 120, and a print system 130. The client system 110 stores files in an input device 112, such as a hot folder, which stores documents such as print data 114, metadata 116, and/or job tickets. The print server 120 retrieves or receives the documents of the input device 112 and schedules them with the print system 130. The print system 130 may include printer(s) 132, inserter(s) 134, mailer(s) 136, and/or other post-printing devices not shown, and may be operable to mark a medium with ink and/or perform other print-related tasks such as post-print handling of the documents 114 (e.g., inserting, sorting, mailing, etc.) in accordance with print data 114, metadata 116, etc. received at input device 112.

The print server 120 may include an interface 122, a controller 124, and memory 126. The interface 122 may be operable to communicate with devices and systems over a network, such as client system 110, input device 112, and/or print system 130. Input device 112 may be implemented with client system 110 (e.g., as shown in FIG. 1), implemented with print server 120, or implemented as a device in communication with print server 120 that is separate from both client system 110 and print server 120. In one embodiment, input device 112 comprises a hot folder which is configured to automatically sweep files into specific tasks for the print server 120 based on instructions defined for the hot folder. Alternatively or additionally, print server 120 may manage input device(s) 112 that store print data 114 and metadata 116 in different locations, files, devices, or systems regardless as to any association between print data 114 and metadata 116. In any case, the controller 124 may manage the operations of the print server 120 (e.g., retrieves files from hot folders 112 via the interface 122, manages print jobs through a workflow, etc.). Memory 126 may store data used by print server 120 to facilitate processing of the documents 114/116.

The print server 120 is enhanced to merge print data 114 and metadata 116 of a print job in accordance with user-defined instructions. For instance, controller 124 may instantiate input device 112 with an object and/or settings in memory that points to or includes customized instructions for batching print data 114 and metadata 116 as a print job to be processed in print system 130. Illustrative details of the customized processing are described in greater detail in FIG. 2.

Figure 2:
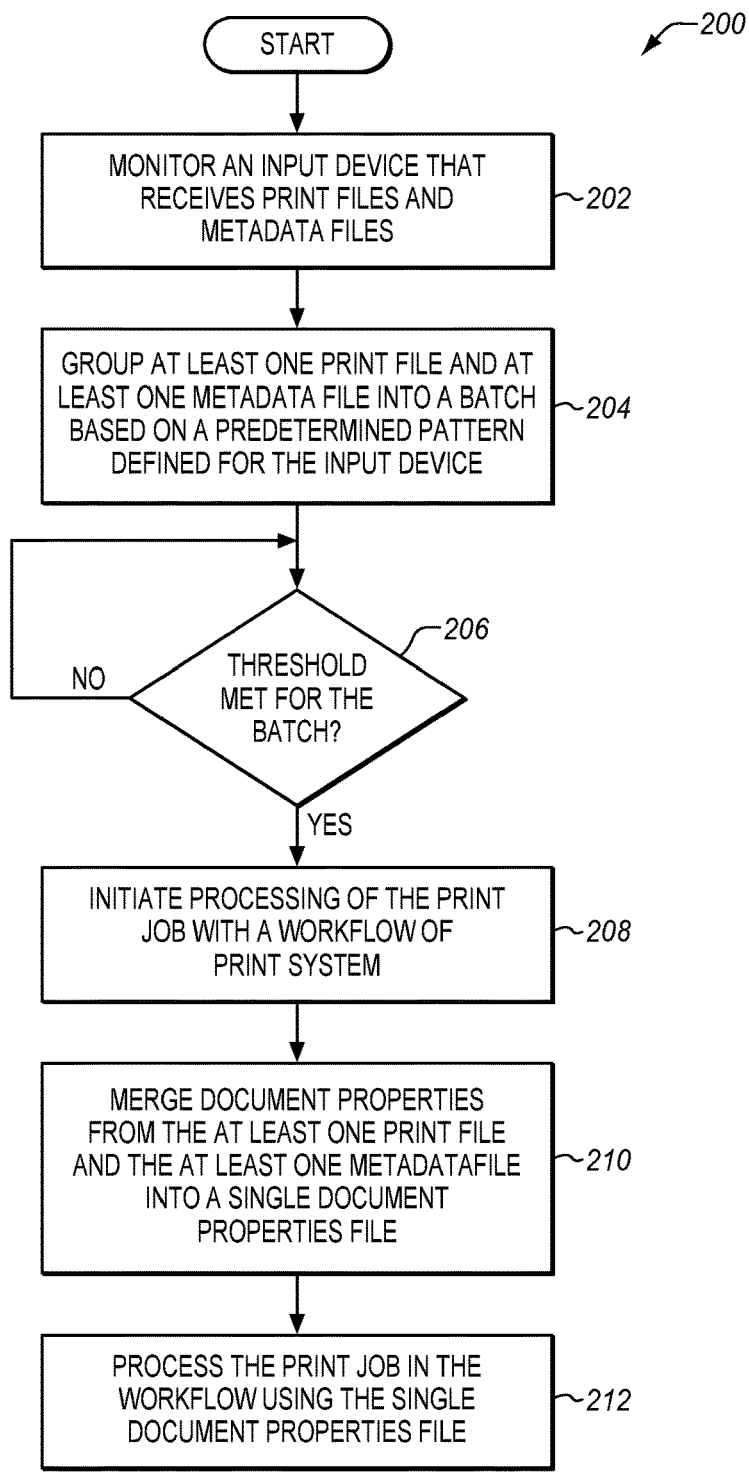
FIG. 2 is a flowchart illustrating a method for operating a print server in a print shop architecture an exemplary embodiment.

FIG. 2 is a flowchart illustrating a method 200 for operating a print server of a print shop architecture in an exemplary embodiment. The steps of method 200 are described with reference to the print shop architecture 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, the controller 124 monitors an input device that receives print files and metadata files. Print files may comprise print data that comprises instructions for processing documents of a print job. Print data for the print job may be formatted in a file according to a Page Description Language (PDL), an Advanced Function Presentation (AFP) datastream, as Portable Document Format (PDF) print data accompanied by Job Definition Format (JDF) job ticket instructions, or any other format appropriate for inclusion in a print job. Metadata may be contextual information used to describe document(s) of the print job or the print job itself, and may be either descriptive or operational. For example, metadata may indicate an author of the print job, may indicate a preferred rasterization algorithm to use while processing the print job, or may indicate any other suitable characteristic of a document or the print job. The accompanying metadata may comprise any number of file formats (e.g., .csv extension file format for .pdf print jobs, etc.). Furthermore, the print data and corresponding metadata may be received at separate locations or input devices 112.

In step 204, the controller 124 groups at least one print file and at least one metadata file into a batch based on a predetermined pattern defined for the input device 112. The predetermined pattern may comprise a filename pattern, file date, client/owner of the print job, or other algorithms programmed into controller 124 (e.g., match first print file with second data file, etc.). A filename pattern may be based on characters up to the first dot, last four characters in the name, etc. Controller 124 may identify batching instructions for the input device 112 that receives data for print jobs to be processed in a print system. The batching instructions may be stored or updated in memory 126 and/or associated with one or more input device(s) 112 in memory 126. The input device 112 may comprise a device and/or other type of location for storing documents (e.g., print data 114 and/or metadata 116), such as a folder or hot folder. Controller 124 may parse the input device 112 for user-defined conditions, such as batching pattern(s), for grouping print data files and metadata files in a set.

In step 206, the controller 124 determines whether a threshold is met for batching the files as a set. Alternatively or additionally, the input device 112 itself may be configured to determine whether the threshold is met. If the set is incomplete (e.g., threshold has not yet been met), controller 124 may continue to monitor input device(s) for detection/identification of files submitted thereto. Otherwise, if a set of files is determined to be complete (e.g., threshold is met), processing may continue to step 208. The threshold may be defined by user-configurable settings for input device 112 stored in memory (e.g., memory 126 and/or memory of input device 112). The threshold may comprise criteria for batching a set of files as a print job for processing in print system 130. Exemplary threshold criteria includes, but is not limited to, number of files, number of pages, a specific time of day, or a specific time interval for grouping a number of sets. Controller 124 may batch a portion of a print job according to criteria defined as a partial threshold for batching files. Thus, controller 124 may batch a subset of files for print processing in the event a complete matching does not occur.

In step 208, the controller 124 initiates processing of a print job with a workflow of the print system. In doing so, controller 124 may receive or retrieve one or more documents from input device 112 and submit the document to print system 130 for processing through a workflow. Controller 124 may determine a batch is complete and a print job may be initiated in the workflow in response to determining that the threshold is reached (e.g., number of pages, time of day, time interval, number of sets, etc.). In one embodiment, only complete sets are added to the batch so the user is ensured that no set is submitted without all of the required files.

A document of a print job may be an independent portion of a print job that may be directed to a specific recipient for delivery (e.g., a single piece of mail). A job ticket or metadata for the print job may identify a recipient for each document, or each document may include print data that identifies a recipient. Thus, multiple documents may be defined in a single file of print data for a print job. Alternatively, a document may be considered an independent portion of a print job that does not require other portions of the print job in order to maintain its whole context or meaning. For example, an individual chapter of a book is not a document, because the chapter needs to be read along with the other chapters of the book in order to be fully understood. In contrast, in a print job with thousands of bank statements where each bank statement is intended for delivery to a different account holder, each bank statement is a complete document in and of itself.

The workflow may define a set of print shop activities that are stored in memory (e.g., in memory 126). For example, the workflow may include configurable activities for directing a printer to print, or directing an inserter to insert documents into an envelope. When properly assembled and configured, the workflow comprises the digitally-defined order of operations to perform at the print shop in order to handle the print job properly. That is, the activities defined in the workflow, when performed in order, enable workflow server 120 to communicate with/manage the print shop devices and process the print job as desired. Each activity in a workflow may be associated with a category or type of print shop device (e.g., post-processing devices, printers, inserters) and may also be associated with specific named print shop devices. These activities may include printing or non-printing activities (e.g., billing, shipping, document review, multimedia/digital/internet activities, credit checks, etc.) as desired. Controller 124 may select a workflow for the documents of the print job to initiate processing of the print job through the print workflow.

In step 210, controller 124 merges document properties from the at least one print file and the at least one metadata file into a single document properties file. In doing so, controller 124 may identify groups of pages corresponding to individual documents of the print job and extract/combine values of document properties in the print data (e.g., account number, customer name, etc.) and/or values of properties in the metadata from the metadata file corresponding to the print document (e.g., PDF print document) in the set. For instance, controller 124 may correlate identified print data files with contextual metadata information that describes the print data files and merge the property values from both the print data and the metadata into a single document property file. In one embodiment, one or more of the activities described above in connection with step 210 may be performed by a single step or activity defined in the print workflow. In another embodiment, values for properties submitted in the metadata file (e.g., .CSV extensions) for each document may be merged with values for the document properties extracted from the data and written to a single document properties file at the same time (e.g., by a single step in the workflow and/or via one pass through the data). In another embodiment, document properties may be merged after composition of print data. During this merging of files, the relationship between the documents in the print file and the entries in the metadata file may be preserved.

In step 212, controller 124 processes the print job in the workflow using the combined data and document property files. That is, the subsequent step(s) defined in the workflow may process the batch according to the single document properties file. Thus, using method 200 described above, the workflow may be able to operate on a complete set of metadata from two different sources of information—the properties identified inside the data file and the properties received in the corresponding metadata file. Subsequent steps in the workflow may use the document property values in a single document properties file to ensure each document is processed correctly.

EXAMPLES

In the following example, additional processes, systems, and methods are described in the context of a print shop that prints and sorts account statements for mass-mailing to customers. In this example, a print server operates on a computer of the print shop that is accessible via the Internet. The print server accesses print shop devices via an internal print shop intranet, to which a printer, e-mail server, and inserter of the print shop are connected.

Files for an incoming print job may be received at a hot folder of the print server in a Portable Document Format (PDF) format. The hot folder helps automate workflow processes in printing environments. For example, a user may copy files of a print job into the folder for automatic processing and routing to a workflow. Configuration of the hot folder includes batching instructions that define conditions for batching files in the hot folder into a print job. A configuration of user-defined entries as shown in FIG. 3.

Figure 3:
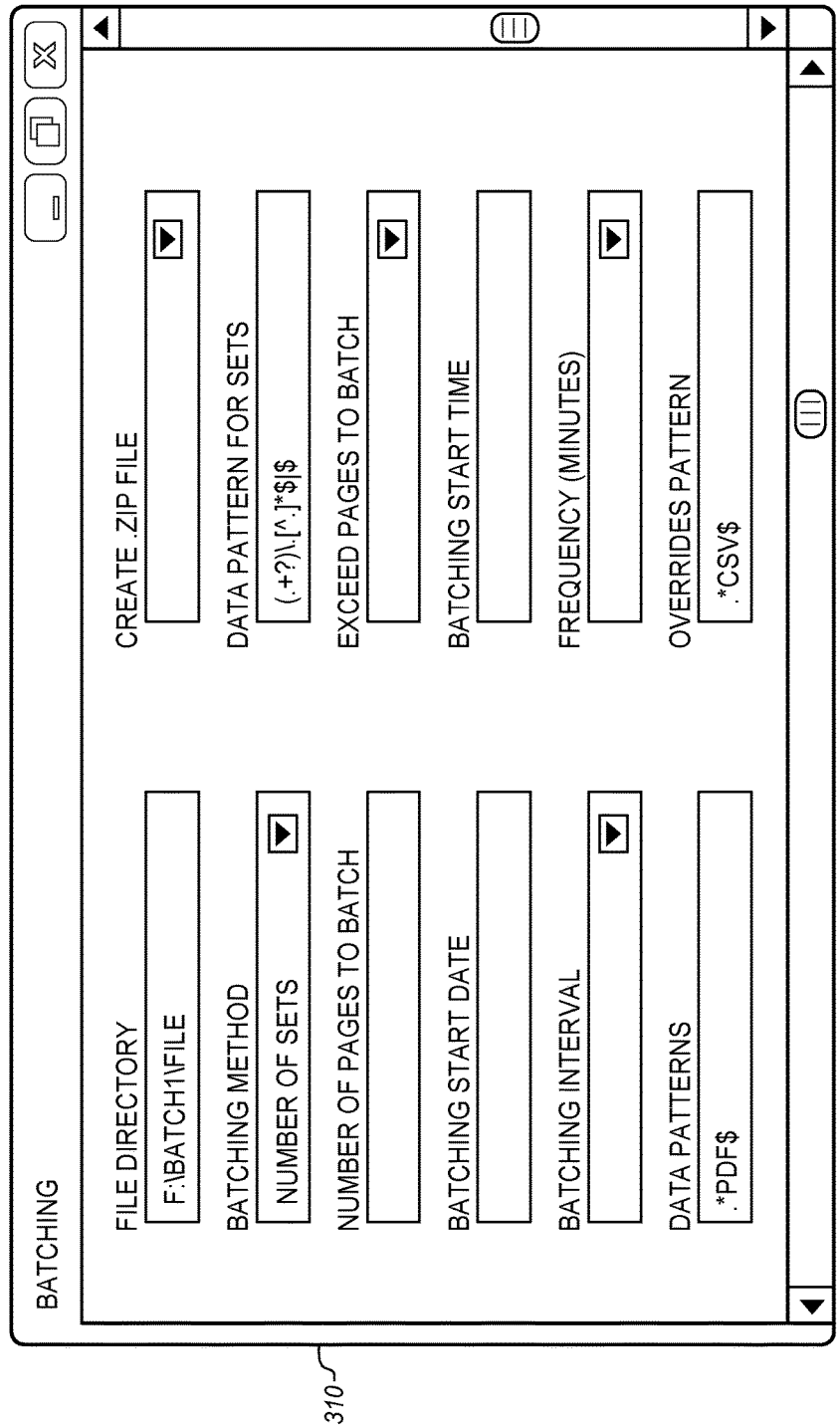
FIG. 3 is a diagram illustrating a user window for defining batching instructions in an exemplary embodiment.

FIG. 3 is a diagram 300 illustrating a user window 310 for defining batching instructions in an exemplary embodiment. In this example, the user window 310 includes a series of entry definitions input by a user (e.g., as text input or dropdown selection via a graphical user interface in communication with the print server). Exemplary entries include a file location, a batching method (e.g., a specific number of sets, a number of pages in the PDF files, a specific time of day, etc.), a number of pages to batch, a batching interval/ frequency (e.g., time or range of pages), a batching start date/time, whether to create compression file, a number or identification of pages to exceed to batch, and data pattern definitions.

With the batching instructions defined/set by the user, controller 124 may determine (e.g., periodically) whether a complete set of documents exists as documents are copied to the hot folder. For example, for a user that submits .PDF and .CSV files to the hot folder and indicates in the batching instructions to group sets by stems of the file names, the controller may determine that a complete set exists if document1.pdf and document1.csv are each detected.

Alternatively or additionally, the batching instructions may indicate one or more regular expression patterns to use in matching/grouping documents into complete sets. The example of FIG. 3 shows that the user has set the batching method to "number of sets" batching and indicates data patterns for the hot folder is set to ".*pdf$" and the file patterns set to ".*csv$". In this case, the matching pattern for a set is composed of files that match those two file patterns and whose file name stems are the same.

FIG. 3 additionally shows a default matching pattern for sets is a regular expression "(.+?)\.[^.]*$|$" which matches to the last "." (dot) in the filename. Thus, for this case, if 1.pdf arrives and 2.csv arrives, those files may be determined as not being part of the same set as a result of these batching instructions. When 1.csv arrives, it may be matched with 1.pdf, so 1.pdf and 1.csv make a set. Then when 2.pdf arrives, 2.csv and 2.pdf make a set.

The default matching pattern may apply to specific batching methods and not others. For example, properties of the default matching pattern may apply when the batching method is defined by pages in set, number in set, or set by time. If, however, the default matching value is null, this indicates that no matching is performed and the controller matches files in the hot folder in the order that they arrive in the hot folder. For example, controller 124 assumes that the first received PDF matches the first received CSV and that they form a set. A regular expression defined in the workflow may contain a single group so that there is no confusion in what part of the file name to match.

Assume, for example, the user wishes to match files according to digits before the dot and not the character before the dot. If the four files received at the hot folder are "AFP123.afp", "CSV123.csv", ", "AFP234.afp", and "CSV234.csv" a pattern to use to match digits may be defined in the batching instructions as "*?([0-9]+?)\.[^.]*$|$" and the default regular expression pattern defined as "(.+?)\.[^.]*$|$" so that there is no confusion in what part of the file names to match. The controller checks if a data file name matches the regular expression, and if true, then extracts the matching group (files with 123 for the first example, and 234 for the second example), and uses the result forward for matching other files that belong to that group.

Thus, the user may define a set of patterns for the hot folder which make up a set of documents. A plurality of sets may be grouped into a batch based on threshold settings such as number of pages, time of day, time interval, number of files, number of sets, etc. Only complete sets may be added to the batch so the user is ensured no that no set is submitted without all of the necessary files. When a batch is complete it is submitted as a job to the system.

The job's workflow contains a step that identifies the documents in the job. This step identifies document properties from data inside the PDF files for each set. At the same time, values for document properties provided in the metadata file in the set are combined with document properties identified from the PDF data into one complete set of document properties. The PDF document property extraction and combining of the metadata is done at the same time, which greatly improves efficiency. Also by doing this in one step, the rest of the workflow may take the proper action on each document and ensure it is produced correctly based on all of its properties.

In another example, suppose the hot folder receives two separate PDF files (e.g., 1.pdf and 2.pdf) describing document properties of two different statements. Suppose further that 1.pdf arrives with 1.csv which includes user information (e.g., member level, renewal date, favorite store, etc.) for a company not contained in the print file itself. Arriving with 2.pdf is 2.csv which includes values for these same properties. With the techniques described herein, the identified batching rules may, for example, use last names associated with the files to keep 1.csv with 1.pdf and 2.csv with 2.pdf. The files may be kept in separate directories until a later step in the workflow merges 1.pdf and 2.pdf into one print file and merges 1.csv and 2.csv into the metadata files for the combined print job.

Figure 4:
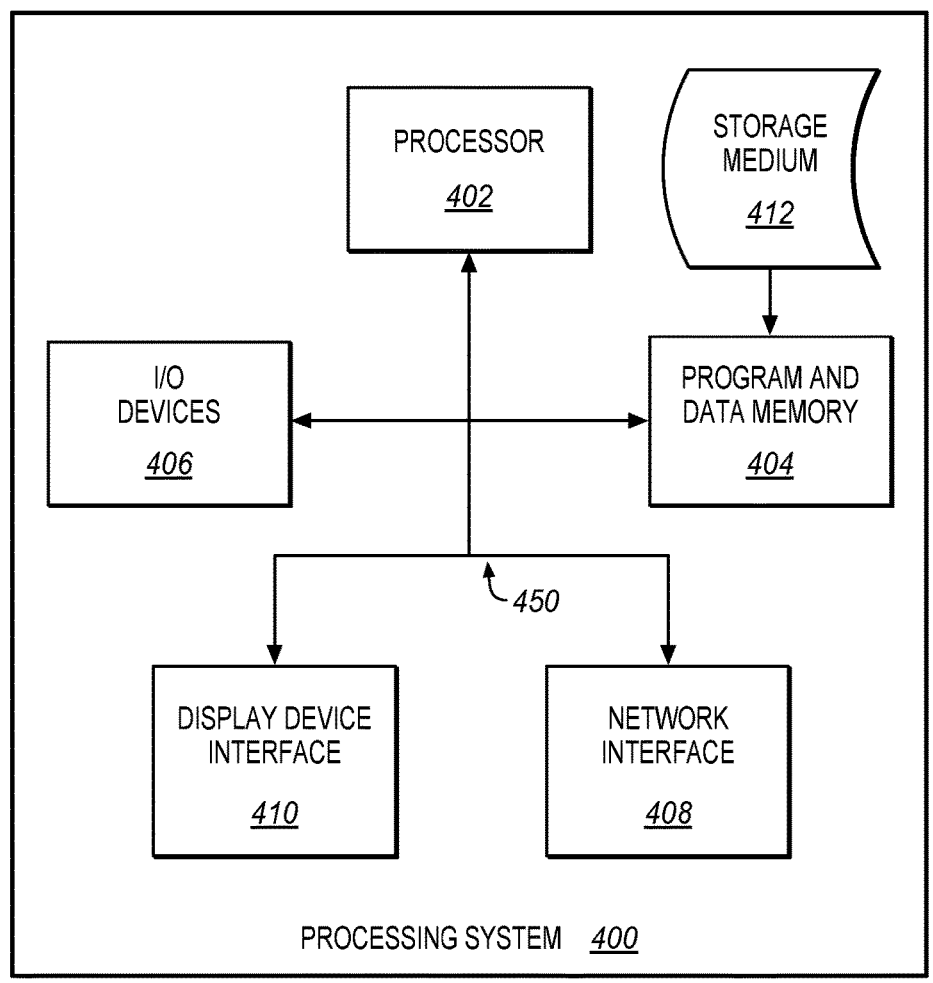
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print shop architecture 100 to perform the various operations disclosed herein. FIG. 4 illustrates a processing system 400 operable to execute a computer readable medium embodying programmed instructions to perform desired functions in an exemplary embodiment. Processing system 400 is operable to perform the above operations by executing programmed instructions tangibly embodied on computer readable storage medium 412. In this regard, embodiments of the invention can take the form of a computer program accessible via computer-readable medium 412 providing program code for use by a computer or any other instruction execution system. For the purposes of this description, computer readable storage medium 412 can be anything that can contain or store the program for use by the computer.

Computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to program and data memory 404 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc.) can be coupled either directly or through intervening I/O controllers. Network adapter interfaces 408 may also be integrated with the system to enable processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 410 may be integrated with the system to interface to one or more display devices, such as printing systems and screens for presentation of data generated by processor 402.

Although specific embodiments were described herein, the scope of the invention is not limited to those specific embodiments. The scope of the invention is defined by the following claims and any equivalents thereof.

We claim:

1. An apparatus comprising:
a print server comprising:
    memory configured to store one or more print files and one or more metadata files;
    a controller configured to monitor the memory to detect a print file and a metadata file that match according to user-defined criteria for matching files, to determine that the print file and the metadata file form a complete group of files according to user-defined criteria for grouping files, and to submit the print file and the metadata file to a print workflow in response to determining that the print file and the metadata file form the complete group of files; and
    a processor to implement the print workflow, wherein the print workflow includes a configurable set of steps that prepare a plurality of documents in the print file for printing, wherein the documents include account information of customers, wherein the print workflow prepares each document for delivery to a different customer, wherein the documents of the print file include first values related to the account information of customers, and wherein the metadata file includes second values related to the account information of customers;
    wherein a step of the print workflow is configured to merge the first values from the print file and the second values from the metadata file into a single document properties file; and
    wherein subsequent steps in the print workflow process the documents of the print file according to the single document properties file.

2. The apparatus of claim 1 wherein a relative order of the first values in the print file and the second values in the metadata file is preserved in the single document properties file processed by the subsequent steps in the print workflow.

3. The apparatus of claim 1 wherein the step is configured to merge the first values and the second values into the single document properties file after composition of the documents in the print file.

4. The apparatus of claim 1 wherein the user-defined criteria for matching files is a filename pattern.

5. The apparatus of claim 1 wherein the user-defined criteria for grouping files is a number of pages.

6. The apparatus of claim 1 wherein the user-defined criteria for grouping files is a time interval for receiving files at the memory.

7. The apparatus of claim 1 wherein the user-defined criteria for grouping files is a predetermined number of print files having a matching metadata file.

8. The apparatus of claim 7 wherein the predetermined number comprises all of the print files for a particular job.

9. A method comprising:
  storing, in memory, one or more print files and one or more metadata files;
  monitoring the memory with a controller to detect a print file and a metadata file that match according to user-defined criteria for matching files;
  determining that the print file and the metadata file form a complete group of files according to user-defined criteria for grouping file;
  submitting the print file and the metadata file to a print workflow in response to determining that the print file and the metadata file form the complete group of files, wherein the print workflow includes a configurable set of steps that prepare a plurality of documents in the print file for printing, wherein the documents include account information of customers, wherein the print workflow prepares each document for delivery to a different customer, wherein the documents of the print file include first values related to the account information of customers, and wherein the metadata file includes second values related to the account information of customers;
  merging, with a step of the print workflow, the first values from the print file and the second values from the metadata file into a single document properties file; and
  processing the documents of the print file with subsequent steps in the print workflow according to the single document properties file.

10. The method of claim 9 wherein a relative order of the first values in the print file and the second values in the metadata file is preserved in the single document properties file processed by the subsequent steps in the print workflow.

11. The method of claim 9 wherein the step is configured to merge the first values and the second values into the single document properties file after composition of the documents in the print file.

12. The method of claim 9 wherein the user-defined criteria for matching files is a filename pattern.

13. The method of claim 9 wherein the user-defined criteria for grouping files is a number of pages.

14. The method of claim 9 wherein the user-defined criteria for grouping files is a time interval for receiving files at the memory.

15. The method of claim 9 wherein the user-defined criteria for grouping files is a predetermined number of print files having a matching metadata file.

16. The method of claim 15 wherein the predetermined number comprises all of the print files for a particular job.

17. A non-transitory computer readable medium embodying programmed instructions which, when executed by a processor, are operable for performing a method comprising:
  storing, in memory, one or more print files and one or more metadata files;
  monitoring the memory with a controller to detect a print file and a metadata file that match according to user-defined criteria for matching files;
  determining that the print file and the metadata file form a complete group of files according to user-defined criteria for grouping file;
  submitting the print file and the metadata file to a print workflow in response to determining that the print file and the metadata file form the complete group of files, wherein the print workflow includes a configurable set of steps that prepare a plurality of documents in the print file for printing, wherein the documents include account information of customers, wherein the print workflow prepares each document for delivery to a different customer, wherein the documents of the print file include first values related to the account information of customers, and wherein the metadata file includes second values related to the account information of customers;
  merging, with a step of the print workflow, the first values from the print file and the second values from the metadata file into a single document properties file; and
  processing the documents of the print file with subsequent steps in the print workflow according to the single document properties file.

18. The medium of claim 17 wherein a relative order of the first values in the print file and the second values in the metadata file is preserved in the single document properties file processed by the subsequent steps in the print workflow.

19. The medium of claim 17 wherein the user-defined criteria for grouping files is a predetermined number of print files having a matching metadata file.

20. The medium of claim 19 wherein the predetermined number comprises all of the print files for a particular job.

* * * * *